United States Patent [19]

Hanaya et al.

[11] Patent Number: 4,745,014

[45] Date of Patent: May 17, 1988

[54] PACKAGING MATERIAL AND SEALING CAP

[75] Inventors: Toru Hanaya, Ikoma; Masaei Ibi, Isesaki, both of Japan

[73] Assignee: Nippon Film Industrial Co., Ltd., Japan

[21] Appl. No.: 822,162

[22] Filed: Jan. 24, 1986

[30] Foreign Application Priority Data

Jan. 25, 1985 [JP] Japan .................................. 60-13211
Dec. 27, 1985 [JP] Japan ................................ 60-298579

[51] Int. Cl.$^4$ ...................... B32B 15/08; B65B 53/02
[52] U.S. Cl. ..................................... 428/36; 428/164; 428/457; 428/213; 426/412; 53/442
[58] Field of Search ............... 426/412; 428/457, 458, 428/461, 463, 910, 213, 35, 152, 36, 164; 156/85, 86; 53/442

[56] References Cited

U.S. PATENT DOCUMENTS 3,770,556 11/1973 Evans et al. ..................... 156/86
4,133,924 1/1979 Seino et al. ..................... 428/458
4,606,954 8/1986 Rausing et al. ................. 156/86

Primary Examiner—John E. Kittle
Assistant Examiner—James J. Seidleck

[57] ABSTRACT

This invention provides a packaging material comprising a metallic foil and at least one heat-shrinkable film of synthetic resin disposed on at least one surface of the metallic foil, the film being superposed on the metallic foil and comprising superposed portions bonded to the metallic foil and superposed portions to be heat-shrunk and not bonded to the metallic foil, and the portions to be heat-shrunk of the film being shrunk by application of heat and also provides a sealing cap made of the packaging material suitable for sealing the capped mouths of bottles for wine, champagne or the like.

28 Claims, 4 Drawing Sheets

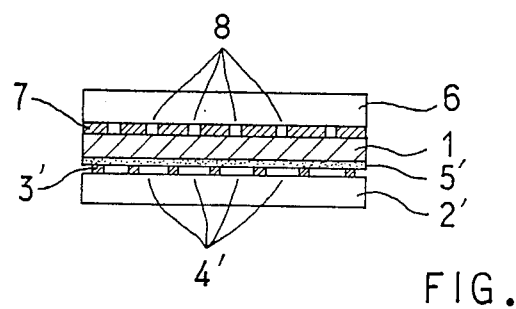
FIG. 8
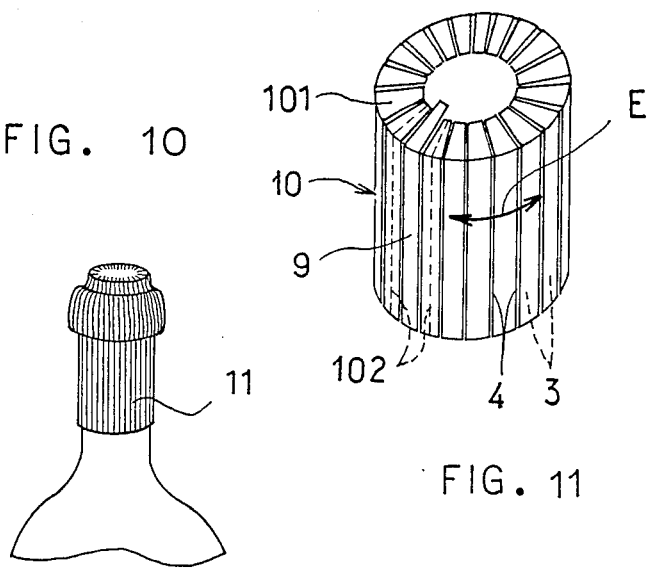
FIG. 9
FIG. 10
FIG. 11
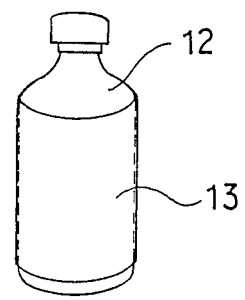

PACKAGING MATERIAL AND SEALING CAP

BACKGROUND OF THE INVENTION

This invention relates to packaging materials useful for packaging a variety of articles and more particularly to packaging materials suitable for sealing the capped mouths of containers such as bottles for, e.g., wine, champagne and like alcoholic liquors, fruit juice drinks, sauces and like seasonings, etc. and to sealing caps made of such packaging materials.

Conventional seal caps over the closed mouths of containers such as glass bottles for wine, champagne or the like include those produced by spinning tin foils and those prepared from heat-shrinkable plastics films.

However, the seal caps of tin foils involve the following problems: (1) spinning of tin foils tends to wrinkle or buckle the foil, resulting in seal caps with an unseemly appearance as a whole and in difficulties in reading the characters or the like printed on the foil, (2) the manufacture of seal caps entails much labor and consequently high production costs, (3) the tin foil is difficult to fit around the mouths of bottles and thus the seal is unsatisfactory in reliability and safety, and (4) the seal cap, although made of tin, is low in metallic luster and thus less decorative in case of need for metallic luster.

The seal cap of heat-shrinkable plastics films have the drawbacks: (1) the plastics film is so low in shape retention as to be difficult to fit around the mouths of bottles, and (2) the film entirely lacks metallic luster and can not be used in case of need for metallic luster.

It may be thought that the foregoing drawbacks would be overcome by using a packaging material useful for decorative labels and having a metallic deposit over a heat-shrinkable plastics film. But such packaging materials have a heat-shrinkable film covered with heat-unshrinkable metal and thus cause various problems in heat treatment with hot water, water vapor or hot air, consequently far from remedying the defects.

More specifically, these packaging materials encounter the problems: (1) if the metallic coat is as hard as a metallic foil, the packaging material has reduced heat shrinkability or the metallic coat tends to wrinkle because of the rupture of bonding layer between the film and the metallic coat, and (2) the metallic coat as thin as e.g. a coat formed by vaccum deposition is likely to corrode or to partially peel off the film during heat shrinkage.

SUMMARY OF THE INVENTION

It is an object of this invention to provide heat-shrinkable packaging materials which are easy to heat-shrink, able to snugly fit around an article or its part to be packaged, free from the undesired buckling and wrinkle caused by heat shrinkage and outstanding in metallic luster.

It is another object of the invention to provide heat-shrinkable packaging materials which have a shape retention sufficient to maintain the desired cap or like shape formed prior to heat shrinkage and which are suitable for sealing the closed opening of containers such as bottles for wine, champagne or the like and also for packaging the whole or part of other various articles.

It is a further object of the invention to provide heat-shrinkable packaging materials which can be relatively easily manufactured at low costs.

Other object and features of the invention will become apparent from the following description.

BRIEF DESCRIPTION OF THE DRAWINGS

The present invention will be described below in detail with reference to the accompanying drawings in which:

FIG. 8 is a section taken on X—X line of FIG. 7;

FIG. 9 is a perspective view of a seal cap made of the packaging material (A) as shown in FIG. 6;

FIG. 10 is a perspective view of a seal cap made of the packaging material (A) as shown in FIG. 6 and fitted around the mouth of a wine bottle; and FIG. 11 is a view showing the packaging material (A) of FIG. 6 used for one of other purposes.

DETAILED DESCRIPTION OF THE PREFERRED EMBODIMENT

The foregoing objects of the invention can be achieved by a packaging material comprising a metallic foil and at least one heat-shrinkable film of synthetic resin disposed on at least one surface of the metallic foil, the film being superposed on the metallic foil and comprising superposed portions bonded to the metallic foil and superposed portions to be heat-shrunk and not bonded to the metallic foil, and the portions to be heat-shrunk of the film being shrunk by application of heat.

When the film is bonded to one surface of the metallic foil, a coating which can be joined to the film bonded to the one side of metallic foil may be formed on the other side of the metallic foil or a second film of heat-shrinkable synthetic resin may be bonded to part or the whole of the other side of the metallic foil.

Figure 1:
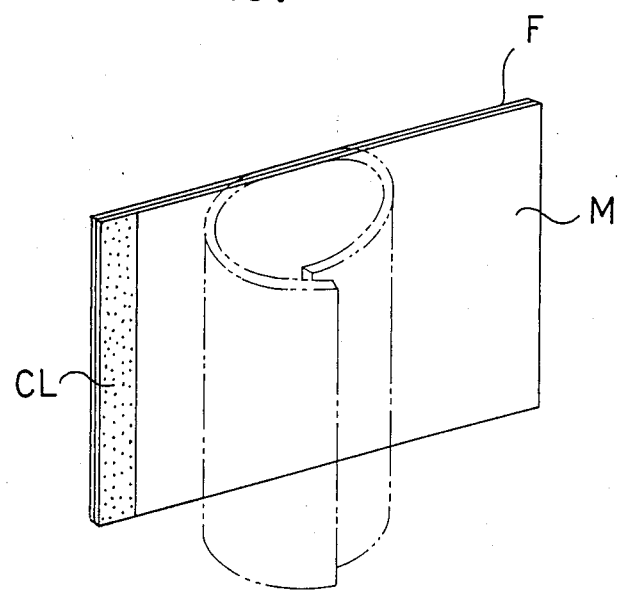
FIG. 1 is a view for explaining an embodiment of this invention wherein a heat-shrinkable film is joined to one surface of a metallic foil and a coating to be described later is partially formed on the other side thereof.

The coating is partially formed over the other side of the metallic foil, for example in a case wherein as shown in FIG. 1, a coating (CL) is provided as an overlapping portion to produce a lap joint for joining together the ends of a packaging material which has a heat-shrinkable film (F) bonded to one surface of a metallic foil (M) and which is cut to a suitable length.

Figure 2:
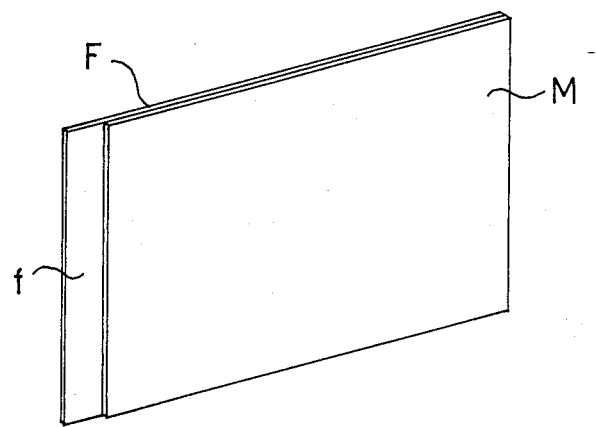
FIG. 2 is a view for explaining an embodiment of the invention wherein one end of a heat-shrinkable film is outwardly extended beyond the end of a metallic foil.

One end of at least one of heat-shrinkable films to be bonded to the metallic foil may be outwardly extended by an adequate length beyond one end of the metallic foil to provide an overlapping portion (f) as indicated in FIG. 2.

The portions to be heat-shrunk of the film (referred to as "shrinking portions" throughout the specification and the appended claims) preferably account for at least about 10% of the area of the metallic foil superposed on the film.

Below 10%, the shrinking portions of the film are too small in area to achieve the desired decorative effect. The area ratio can be increased to over 90%, more specifically 95%, depending on the performance of the adhesive used. More preferred area ratio is about 25% to about 70%.

Heat-shrinkable films of synthetic resins which can be used in this invention include those prepared by forming a thermoplastic synthetic resin into a sheet by extrusion or like molding processes and uniaxially or biaxially stretching the formed flat sheet. Examples of suitable thermoplastic synthetic resins are polypropylene (PP), polyethylene (PE), polyvinyl chloride (PVC), polystyrene (PST), polyester (PES), etc.

Figure 3:
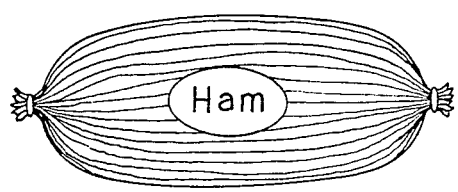
FIG. 3 is a view showing an embodiment of the invention wherein a piece of ham is wrapped up with the packaging material of the invention.

Biaxially stretched films may be used for wrapping up three-dimensional articles to be entirely packaged such as pieces of ham, sausage amd like products as shown in FIG. 3. On the other hand, uniaxially stretched films are preferably used for producing seal caps over the mouths of bottles.

Uniaxially stretched films to be used in this invention are those stretched in the main direction to at least 1.5 times the original length. The term "uniaxially stretched film" used throughout the specification and the appended claims include films slightly stretched in a direction transverse relative to the main stretching direction (throughout the specification and the appended claims, the transverse direction will be called "transverse direction" and the main stretching direction "main direction") as well as those not stretched in the least in the transverse direction. The shrinkage percentage of the heat-shrinkable film to be used in the invention can be expressed in the ratio of change in film length as measured before and after immersion of an unloaded film in a glycerin bath at 100° C. for 30 seconds.

Uniaxially stretched films useful for the packaging materials of the invention are those heat-shrinkable at a rate of at least about 50%, preferably at least about 60%, in the main direction and at a rate of about 15% or less, preferably about 10% or less, in the transverse direction. The films heat-shrinkable at a rate of less than 50% in the main direction is unable or difficult to shrink-fit around the article to be packaged, whereas the films heat-shrinkable at a rate of more than 15% in the transverse direction fails to give a seal having a satisfactory appearance when heat-shrunk. The upper limit of shrinkage percentage in the main direction is about 90%. The pattern of shrinking portions can be adapted to the shrinkage percentage, in the foregoing range, of the film to be used.

Figure 4:
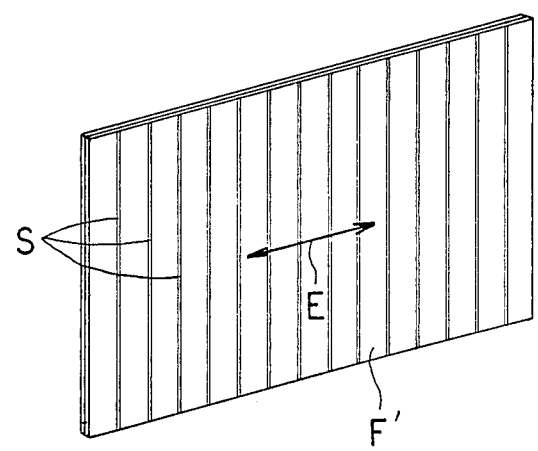
FIG. 4 is a view for explaining the direction in which the shrinking portions of a uniaxially stretched heat-shrinkable film are aligned.

When for example, a uniaxially stretched heat-shrinkable film (F') is used as shown in FIG. 4, the shrinking portions (S) can be advantageously aligned in a direction transverse, preferably at right angle, relative to the main direction (E).

The preferred heat-shrinkable films of synthetic resin to be used in the invention are those having a thickness of about 20 to about 100 μm and high in transparency.

When the second heat-shrinkable synthetic resin film is bonded to the other side of the metallic foil, it is desirable that the second film be identical with the first film in respect of the main direction and be bonded to the metallic foil at the bonding portions of the film which portions correspond in position to those of the first film. When the second film is joined to the metallic foil in this manner, the heat shrinkage gives the desired appearance to the resulting packaging material.

Examples of metallic foils which can be used in this invention are those made of aluminum or aluminum alloy and having a thickness of about 5 to about 30 μm. Those made of other metals can be used if outstanding in metallic luster and flexibility. Metallic foils of thickness greater than 30 μm tends to result in reduced flexibility and in impaired appearance imparted on heat shrinkage, whereas metallic foils below 5 μm in thickness are prone to be significantly difficult to bond to the heat-shrinkable film. Thus those having a thickness in the foregoing range are desirable.

The thickness ratio of the heat-shrinkable film to the metallic foil to be used in the invention is widely variable, ranging from about 1:1 to about 30:1, preferably about 2:1 to about 15:1. The thickness ratio less than 1:1 substantially fails to cause heat shrinkage, whereas the ratio greater than 30:1 reduces the shape retention and gives a packaging material requiring an increased strength for tear.

When required, the surface of metallic foil may be printed with characters to display various items of information and/or formed with a colored layer to give a unique type of improved appearance. The colored layer formed must be substantially transparent to permit passage, reflection and return of the light rays and generally comprises a coloring agent such as a pigment and dye and a binder to be described later. Examples of suitable binders are fibrous derivatives such as methyl cellulose, ethyl cellulose, acetylcellulose, acetylbutylcellulose, carboxyethyl cellulose and hydroxyethyl cellulose; thermosetting resins such as epoxy resin, phenolic resin, acrylic resin and melamine resin; and vinyl chloride-vinyl acetate copolymer. The colored layer may be produced over at least one surface of the metallic foil in its entirety or part.

According to this invention, the heat-shrinkable film of synthetic resin can be bonded to the metallic foil with, for example, an adhesive. Adhesives which can be used are those which will not contract the film nor induce delamination in heat shrinking process. Preferred adhesives capable of fulfilling such requirements are those which, irrespective of the colored layer, can produce a joint between the heat-shrinkable film and the metallic foil with a bonding strength of 100 g/15 mm-wide bonded portion, which is the bonding strength per 15 mm-wide bonded portion, calculated as the basis of the mean bonding strength obtained by repeating a T-peel test thrice with a peel tester operated at a temperature of 20° C. and a speed of 100 mm/min. Representative examples of adhesives meeting the requirements include urethane resin adhesives of the two-pack curable type comprising an organic polyisocyanate and a polyol component such as polyester and polyether.

Figure 5:
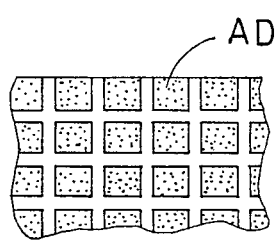
FIG. 5 is a view showing a spotty or dotted pattern of bonding portions for joining a heat-shrinkable film to a metallic foil.

The adhesive is applied to the bonding portions of the film. The pattern of bonding portions can be adequately varied according to the arrangement of shrinking portions in the film, including, e.g. a pattern comprising bonding portions spaced from each other in parallel as in the packaging material (A) shown in FIG. 6 and to be described later, a lattice pattern as in the packaging material (B) shown in FIG. 7 and to be described later, and a spotty or dotted pattern (AD) as depicted in FIG. 5.

When the other side of the metallic foil is covered with a coating attachable to the heat-shrinkable synthetic resin film on the opposed side, the packaging material can be easily formed to a cylindrical shape by bending the material and joining the ends of the material with a lap joint so that the first film constitutes the outside portion of the cylindical body. The coating can be used for other purposes of, e.g. preventing the corrosion of metallic foil and decorating the foil by coloration.

The thickness of the coating preferably ranges from about 0.5 to about 3 μm and must not exceed 10 μm since the thickness of over 10 μm deteriorates the heat shrinkability of the packaging material. If embossed, the coating is advantageous, for example, in that caps of the packaging material according to the invention are more smoothly slidable when fitted around the mouth of bottles. Examples of materials useful for forming the coating are vinyl chloride-vinyl acetate copolymer, ethylene-vinyl acetate copolymer (EVA), ethylene-acrylic or methacrylic acid copolymer, ethylene-acrylate or methacrylate copolymer, carboxylated ethylene-vinyl acetate copolymer, carboxylated polypropylene, chlorinated polypropylene, carboxylated chlorinated polypropylene, etc. Of these materials, those suitable for the heat-shrinkable film to be used are employed in the invention. The term "vinyl chloride-vinyl acetate copolymer" used throughout the specification and the appended claims includes vinyl chloride-vinyl acetate-maleic acid (or maleic anhydride) terpolymers and resin mixtures of the terpolymer with at least one of acrylates, linear polyesters, butyral resins and epoxy resins.

These polymers and resin mixtures are high in adhesion to heat-shrinkable films of polyvinyl chloride or polystyrene and can be dissolved in an organic solvent to produce a thin, uniform coat on metallic foils, hence desirable.

The packaging material with the coating of vinyl chloride-vinyl acetate copolymer can be easily bent to the cylindrical shape as described above.

More specifically, a lap joint can be easily made merely by bringing one end of heat-shrinkable PVC or PST film in the packaging material into contact with an organic solvent such as tetrahydrofuran and n-hexane to swell its surface and superposing its end over an end of the coating of vinyl chloride-vinyl acetate copolymer, followed by pressure.

The packaging materials of the invention can be advantageously used not only for producing seal caps around the mouths of bottles or like containers, but also for wrapping a wide variety of articles and as packaging strings, tapes, labels, etc.

This invention will be described below in greater detail with reference to the accompanying drawings in which the shrinkage percentage of the films and bonding strength were measured by the above-mentioned methods.

EXAMPLE 1

Figure 6:
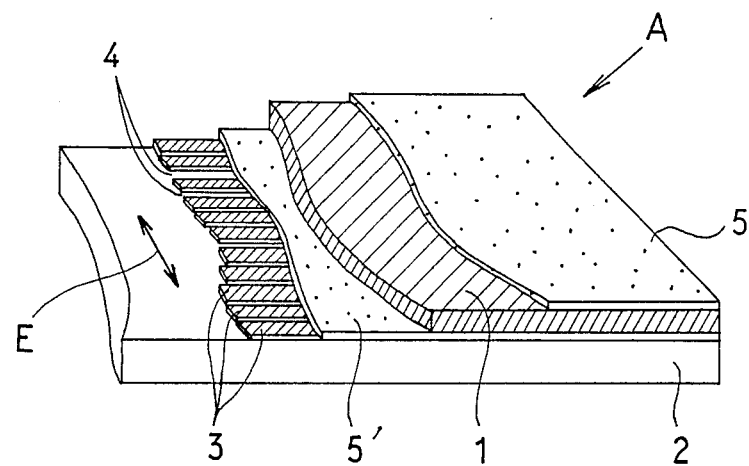
FIG. 6 is a partially cutaway enlarged perspective view showing an embodiment of the invention.

On the both surfaces of a soft aluminum foil strip 1 having a thickness of 9 μm were formed a substantially transparent coating 5 (serving also as a colored layer) and colored layer 5', as shown in FIG. 6, each having a thickness of 2.5 μm and comprising a vinyl chloride-vinyl acetate-maleic anhydride terpolymer containing a coloring pigment of golden color. A transparent urethane resin adhesive of the two-component curable type was applied to the surface of the colored layer 5' to give a number of adhesive layers 3 in a stripe pattern in which the adheisve layers were spaced away from each other by 1 mm and each have a width of 2 mm and thickness of about 3 μm. Upon formation of the layers 3, a transparent uniaxially stretched heat-shrinkable film strip 2 of polyvinyl chloride (product of C.I. Kasei Co., Ltd., Japan, with a thickness of 70 μm, shrinkage percentage of 64% in the main direction and 8% in the transverse direction) was applied to the aluminum foil strip 1 to interpose therebetween the colored layer 5' and the adhesive layers 3 with the main direction (E) vertical to the arrangement direction of the adhesive layers 3. The packaging material (A) thus obtained is a composite one as shown in FIG. 6 and was found to have a shrinkage percentage of 56% in the main direction (E) and 4% in the transverse direction and to possess a joint with a bonding strength of 350 g/15 mm-wide bonded portion.

One end of the packaging material (A) is brought into contact with n-hexane to swell the surface of the PVC film strip 2 and joined to one end of the coating 5 with a lap joint 9, thereby giving a cylindrical body 10 as shown in FIG. 9 in which the PVC film strip 2 constitutes the outside of the body having its axis vertical to the main direction (E) of the film strip 2 as shown in FIG. 9.

The cylindrical body 10 was bent at the upper end thereof 101 in a direction toward the axis of the body to form a sealing cap suitable for sealing the capped mouths of bottles for wine, champagne or the like as illustrated in FIG. 9. The cap was fitted on the mouth of a wine bottle closed with a cork cap and contacted with water vapor at about 100° C. for about 10 seconds to become shrunk. The seal cap 11 thus obtained was found to have an improved appearance and is outstanding in metallic luster, decorative effect, adhesion to the bottle and ease of tear in a direction perpendicular to the main direction (E) as indicated in FIG. 10.

The seal cap 11 was observed under an optical microscope and it was revealed that the portions of the aluminum foil strip 1 corresponding to the shrinking portions 4 of the film strip became buckled as if folded while the portions of the aluminum foil strip bonded to the adhesive layers 3 were free from any buckling. The seal cap 11 exhibited a satisfactory strength attributable to the bucklings of the foil strip 1 produced in corresponding relation with the shrinking portions 4 and serving as ribs.

Indicated at 102 in FIG. 9 are lines of perforations for tearing the cap.

EXAMPLE 2

The same procedure as in Example 1 was repeated with the exception of using: (1) an organic solvent solution of substantially transparent resin comprising a vinyl chloride-vinyl acetate copolymer containing a coloring pigment of red color and ethyl acrylate to produce a coating 5 and a colored layer 5' in the packaging material (A) as shown in FIG. 6 and (2) a transparent PST film strip (product of C.I. Kasei Co., Ltd., Japan, with a thickness of 50 μm and shrinkage percentage of 67% in the main direction and −1% in the transverse direction) as a heat-shrinkable film strip 2. The procedure produced a packaging material having a shrinkage percentage of 53% in the main direction and 0% in the transverse direction and a joint with a bonding strength of 270 g/15 mm-wide bonded portion. The packaging material thus obtained was shrink-fitted around the mouth of a bottle in the same manner as in Example 1 and the seal cap was tested for performance with good results.

The packaging materials produced in Examples 1 and 2 can be used for purposes other than as a seal cap, e.g. as a packaging material 13 for wrapping the body of a container 12 as depicted in FIG. 11. The packaging material 13 used in this way is advantageous in that the bucklings of the aluminum foil can absorb shock, effectively protecting the container.

EXAMPLE 3

Figure 7:
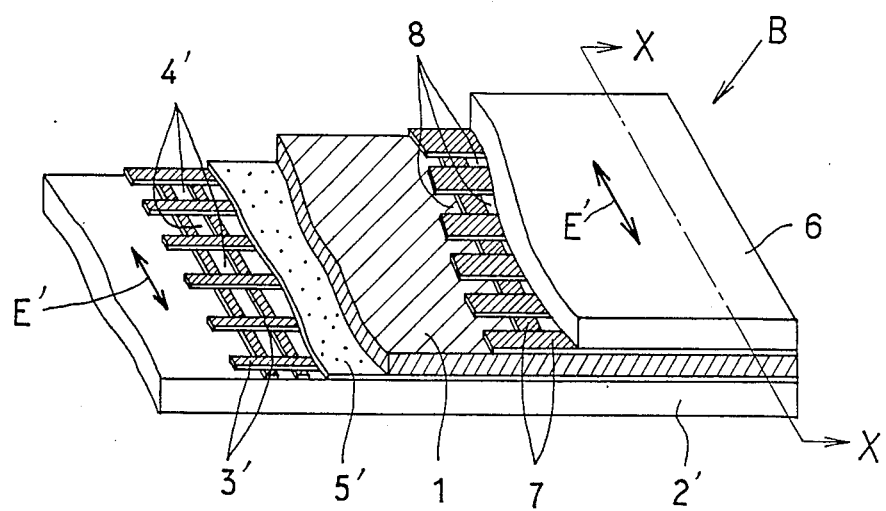
FIG. 7 is a partially cutaway enlarged perspective view showing another embodiment of the invention.

As shown in FIGS. 7 and 8, a vinyl chloride-vinyl acetate-maleic anhydride terpolymer containing a coloring pigment of golden color was applied to one surface of a soft aluminum foil strip 1, 9 μm in thickness, to produce a virtually transparent colored layer 5' having a thickness of 2.5 μm. To the surface of the layer 5' was applied a transparent two-pack curable adhesive of urethane resin to form adhesive layers 3' each having 1 mm in width and about 2.5 μm in thickness in a lattice pattern comprising the layers spaced away longitudinally and transversely from each other by 2 mm. Upon application of the adhesive, a PVC film strip 2' (product of C.I. Kasei Co., Ltd., with a thickness of 40 μm and shrinkage percentage of 64% in the main direction (E') and 8% in the transverse direction) was bonded to one side of the aluminum foil strip 1 with the colored layer 5' and the adhesive layers 3' interposed therebetween.

A second PVC film strip 6 (product of C.I. Kasei Co., Ltd., with a thickness of 50 μm and shrinkage percentage of 59% in the main direction (E') and 6% in the transverse direction) was bonded to the other side of the aluminum foil strip 1, at adhesive layers 7, 2 mm in width and about 2.5 μm in thickness, comprising the same adhesive as used for the adhesive layers 3' and formed on the other side of aluminum foil strip 1 according to a lattice pattern having the layers spaced away longitudinally and transversely from each other by 1 mm. The adhesive layers 7 correspond in position to the adhesive layers 3' so that the shrinking portions 8 surrounded with the adhesive layers 7 correspond in position to the shrinking portions 4' surrounded with the adhesive layers 3'. The packaging material (B) thus prepared was found to have a shrinkage percentage of 50% in the main direction and 0% in the transverse direction and to possess a joint between the film strip 2' and the foil strip 1 with a bonding strength of 180 g/15 mm-wide bonded portion.

The packaging material (B) was made into a seal cap in the same manner as in Example 1, and the seal cap was tested for performance with good results in any of appearance, metallic luster, decorative effect, adhesion to the wine bottle and ease of tear. The seal cap was removed and observed under an optical microscope and the result showed that bucklings occurred at the portions of of the foil strip 1 between the shrinking portions 4' of the film strip 2' and the corresponding shrinking portions 8 of the film strip 6 while the portions of the foil strip 1 on the adhesive layers 3' and 7 respectively were without any buckling. With this structure, the seal cap presented a markedly decorative appearance presumably due to the light rays reflected through the substantially transparent PVC film strip 2' from both the buckled foil portions and the foil portions free from any buckling.

We claim:

1. A packaging material comprising:
   a metallic foil; and
   at least one heat-shrinkable film of synthetic resin disposed on at least one surface of the metallic foil;
   wherein the film superposed on the metalic foil comprises superposed portions bonded to the metallic foil with an adhesive, and which undergoes substantially no shrinkage on the application of heat by virtue of the shape retention of the metallic foil, and superposed portions not bonded to the metallic foil and to be heat-shrunk and the portion of the film to be heat-shrunk being shrunk by application of heat.

2. A packaging material according to claim 1 wherein an adhesive coating which, when the packaging material is made into a cylindrical shape, applied to one of two opposite ends of the film bonded to one side of the metallic foil, is adhered to at least part of the other side of the metallic foil and opposite from said one end to form said cylindrical shape.

3. A packaging material as defined in claim 1 wherein a heat-shrinkable film of synthetic resin is bonded to the other side of the metallic foil, the film bonded thereto being identical with the film on the one side thereof in respect of the film stretching directions and being bonded to the metallic foil at the bonding portions which correspond in position to those of the film on the one surface.

4. A packaging material as defined in claim 1 wherein one end of at least one of the heat-shrinkable films bonded to the metallic foil is extended outwardly beyond one end of the metallic foil to provide an overlapping portion for producing a lap joint.

5. A packaging material as defined in claim 1 wherein the metallic foil has a thickness of about 5 to about 30 μm.

6. A packaging material as defined in claim 1 wherein the metallic foil is an aluminum foil or an aluminum alloy foil.

7. A packaging material as defined in claim 1 wherein the heat-shrinkable film of synthetic resin is a substantially transparent one prepared by molding a thermoplastic synthetic resin selected from the group consisting of polypropylene, polyethylene, polyvinyl chloride, polystyrene and polyester into a sheet and stretching the sheet.

8. A packaging material as defined in claim 1 wherein the heat-shrinkable film has a thickness of about 30 to about 100 μm.

9. A packaging material as defined in claim 1 wherein the heat-shrinkable film of synthetic resin is a uniaxially stretched film having the shrinking portions which are aligned in the transverse direction.

10. A packaging material as defined in claim 9 wherein the shrinking portions of the heat-shrinkable film are arranged in a direction vertical to the main direction.

11. A packaging material as defined in claim 9 wherein the heat-shrinkable film has a shrinkage percentage of at least 50% in the main direction and 15% or less in the transverse direction.

12. A packaging material as defined in claim 9 wherein the heat-shrinkable film has a shrinkage percentage of at least 60% in the main direction and 10% or less in the transverse direction.

13. A packaging material as defined in claim 1 wherein the shrinking portions of the heat-shrinkable film account for abount 10 to 95% of the area of the metallic foil to which said film is bonded.

14. A packaging material as defined in claim 1 wherein the shrinking portions of the heat-shrinkable film account for about 25 to about 70% of the area of the metallic foil to which said film is bonded.

15. A packaging material as defined in claim 1 wherein the shrinking portions of the heat-shrinkable film are arranged in a lattice pattern.

16. A packaging material as defined in claim 1 wherein the shrinking portions of the heat-shrinkable film are arranged in a spotty or dotted pattern.

17. A packaging material as defined in claim 3 wherein the heat-shrinkable film bonded to the one surface of the metallic foil is higher in shrinkage percentage than the film bonded to the other side of the metallic foil.

18. A packaging material as defined in claim 3 wherein each of the shrinking portions of the heat-shrinkable film bonded to the one surface of the metallic foil has a larger area than the corresponding shrinking portions of the film bonded to the other surface of the foil.

19. A packaging material as defined in claim 1 wherein the heat-shrinkable film is bonded to the metallic foil with a substantially transparent urethane resin adhesive of the two-pack curable type.

20. A packaging material as defined in claim 1 wherein the heat-shrinkable film of synthetic resin is bonded to the metallic foil with an adhesive to produce a joint having a bonding strength of at least 100 g/15 mm-wide bonded portion.

21. A packaging material as defined in claim 1 wherein the thickness ratio of the heat-shrinkable film of synthetic resin to the metallic foil is in the range of from about 1:1 to about 30:1.

22. A packaging material as defined in claim 2 wherein the coating has a thickness of 10 $\mu$m or less.

23. A packaging material as defined in claim 2 wherein the coating has a thickness of about 0.5 to about 3 $\mu$m.

24. A packaging material as defined in claim 1 wherein the coating comprises at least one selected from the group consisting of vinyl chloride-vinyl acetate copolymer, ethylene-vinyl acetate copolymer, ethylene-methacrylic methacrylic or acrylic acid copolymer, carboxylated ethylene-vinyl acetate copolymer, carboxylated polypropylene, chlorinated polypropylene and carboxylated chlorinated polypropylene.

25. A packaging material as defined in claim 22 wherein the vinyl chloride-vinyl acetate copolymer is a vinyl chloride-vinyl acetate-maleic acid (or maleic anhydride) terpolymer or a resin mixture of the terpolymer and at least one of acrylates, linear polyesters, butyral resins and epoxy resins.

26. A packaging material as defined in claim 1 wherein a substantially transparent colored layer is formed on at least one surface of the metallic foil and the heat-shrinkable film of synthetic resin is bonded to the one surface thereof through the colored layer.

27. A packaging material as defined in claim 24 wherein the colored layer has a golden color.

28. A sealing cap prepared by forming the packaging material of claim 9 into a cylindrical body having its axis transverse in respect of the main direction of the film, and bending the upper portion of the cylindrical body toward the axis of the body.

* * * * *